United States Patent [19]

Ellwood

[11] Patent Number: 4,660,319
[45] Date of Patent: Apr. 28, 1987

[54] BEDDING DEVICE FOR AN ANIMAL LEG HOLD TRAP

[76] Inventor: Robert E. Ellwood, Box 148, Conesville, Ohio 43811

[21] Appl. No.: 845,635

[22] Filed: Mar. 28, 1986

[51] Int. Cl.$^4$ .............................................. A01M 23/26
[52] U.S. Cl. ........................................... 43/96; 43/58
[58] Field of Search .................... 43/96, 58, 63, 88, 93

[56] References Cited

U.S. PATENT DOCUMENTS

| | | | |
|---|---|---|---|
| 4,272,907 | 6/1981 | Skapura | 43/96 |
| 4,439,947 | 4/1984 | Smagner | 43/96 |
| 4,505,064 | 3/1985 | Smagner | 43/96 |

Primary Examiner—Kenneth J. Ramsey
Assistant Examiner—Christopher L. McKee
Attorney, Agent, or Firm—Jeffrey A. Wyand

[57] ABSTRACT

A bedding device for use with an animal leg hold trap includes a platform providing support for the free jaw of the trap when the trap is in its set position. In one embodiment, the platform contains one or more integral channels for releasably retaining in the device at least one frame member of the trap. The channels are defined: (i) by floors that are shaped to accommodate the contour of a frame member; and (ii) by convergent, upstanding resilient side walls for snapping the frame member into position and releasing it upon triggering of the trap. In another embodiment, one or more resilient clips are inserted from the bottom of the platform through holes in the platform. The clips retain a trap frame member between their convergent legs. The platform is preferably formed from a single piece of material, most preferably a resilient polymer, such as polypropylene, polystyrene and teflon, that does not absorb odors. Openings, such as holes or depressions, in the platform accommodate protruding trap parts, such as the springs and levers, and permit the platform to be spiked to the earth. Both the novice and experienced trapper can achieve a higher quality set faster when using the bedding device, since with it less earth needs to be packed around the trap and at least some of that earth can be packed with less care.

10 Claims, 8 Drawing Figures

BEDDING DEVICE FOR AN ANIMAL LEG HOLD TRAP

BACKGROUND

Trappers commonly use leg hold traps for capturing small game, such as red and gray foxes, bobcats, coyotes, raccoons and the like, mainly for pelts. The traps are relatively simple and inexpensive, but using them effectively is an art that is ordinarily learned through long experience by trial and error. To catch particularly wily animals, such as foxes, the trap must be carefully concealed. Evidence of disturbance of the trapping site must be minimized and no human scent should be left at the site. Achieving these ends normally requires both skill and experience.

Typically, a site for setting a trap for a fox is selected near brush or other vegetation that acts as a backing that the fox will not penetrate. A hole that is slightly deeper than the height of the trap when the trap is in the set position is excavated near the vegetation. The trap is set on the earth in the bottom of the hole, the trigger or pan of the trap is protected and the hole is refilled with dirt that has been removed from the hole and sifted. The removed soil is sifted to remove stones, twigs and like debris that may interfere with the operation of the trap. Alternatively, dirt that has already been sifted may be brought to the site by the trapper and used to fill the hole. In either case, the hole is filled to or slightly below the level of the surrounding earth. After the hole is filled, soil is carefully placed over the pan to conceal it without triggering the trap. It is important that the dirt be packed into hole around the trap with sufficient firmness. Since the pan is located near the center of the trap when it is set, it is possible for a fox or other animal wandering around the trap site to step on the excavated site, and even on one of the trap jaws, without triggering the trap. If the earth yields beneath the animal's foot, the animal is alerted to an unnatural condition and will leave the site without being trapped. Therefore, soil must be packed in the excavation as tightly as possible, except around the pan, to simulate the original, undisturbed ground conditions. It can be particularly critical to pack the soil properly under the so-called free jaw of the trap. The free jaw is not held in place when the trap is in its set position, but is free to rotate upward and slightly downward on its axis of rotation. Since in most sets a foot of the animal must cross over the free jaw before reaching the pan, the earth supporting the free jaw must be carefully packed to prevent the yielding that discloses the presence of the trap. Of course, the ground must not be too tightly packed around the free jaw or other parts of the trap or else the trap will be fouled by dirt and the speed of the closing of its jaws will be slowed. Slow trap closure can allow faster animals, such as foxes, to escape the closing jaws.

Many trappers deposit a scented liquid at a trap site to lure curious animals to the trap. Whether or not an alluring scent is deposited at the site, it is difficult to eliminate the human odor that is invariably left as a result of the excavation and repacking of soil. Since foxes, in particular, have an extremely keen sense of smell, minimizing the traces of human presence is important for successful trapping. Frequently, the sifted soil removed from the excavation is insufficient to fill the hole with the trap in it. Removed debris reduces the volume of the sifted soil and the soil is often packed into the hole more densely by the trapper than it was by nature. In wet conditions, none of the excavated wet soil or mud may be suitable for filling the excavation properly. Therefore, the trapper must usually carry extra soil with him to supplement or replace the excavated soil. Since extra soil can carry odors that may alert a curious animal to the presence of a trap and can leave an unnatural appearance where the extra soil does not blend well with the existing soil, its use should also be minimized.

The successful trapper attains a high quality set by working quickly. By using the shortest possible set time, the trapper minimizes the amount of his own scent that is left at the site. But there is a limit even to the experienced trapper's speed, since it is essential to pack the excavation properly and to leave the site with as natural an appearance as possible. In the invention, the speed with which a trapper can achieve a high quality set is increased over that previously obtainable.

SUMMARY OF THE INVENTION

In the invention, a bedding device includes a platform that supports a leg hold trap at the trapping site. In a preferred embodiment of the invention, the platform includes one or more protrusions that support the free jaw of a set trap that is placed on the platform. By positively supporting the free jaw, packing of earth beneath that jaw during setting is no longer critical to a proper set, reducing setting time. The platform, and especially the jaw supporting protrusion, occupy space that is excavated in setting the trap. Therefore, the amount of extra soil needed to fill the excavation with tightly packed, sifted soil is either reduced or eliminated altogether. In wet conditions, when none of the excavated soil is suitable for refilling the excavation, the bedding device reduces the amount of soil that must be carried to the trap site to replace the excavated soil.

The bedding device, in one embodiment, includes a unitary platform that has one or more channels on its top side for receiving and releasably retaining a leg hold trap. Each channel has a floor that may be shaped to accommodate the contour of the trap element that it receives. The channel is further defined by opposed walls extending outwardly from the platform. The walls preferably are convergent. In a preferred embodiment, the platform is made from a resilient material, so that the walls can be slightly deflected to snap the trap into place on the platform. When the trap is triggered, the energy released lifts the trap out of the channel or channels and free of the platform.

In another embodiment of the invention, the platform contains at least one pair of holes for receiving a U-shaped clip. Each clip has resilient, opposed legs that are deflected to receive a frame member of a leg hold trap. A clip is inserted from the bottom of the platform and one of its legs protrudes through each of the holes above the top of the platform. Preferably the clips are made of a corrosion-resistant material such as a stainless steel or a plastic. The head of the clip bridging the legs may contain a hole to engage a projection that extends from the bottom of the platform for retaining the clip in storage and in the field.

The bedding device platform is preferably made from a material that does not absorb odors to betray human handling. Polypropylene, polystyrene, teflon and other polymers are examples of such materials and can be molded or machined to form jaw supports and, if present, channels with resilient walls adjacent the channels.

The platform preferably contains holes or depressions to accommodate various downwardly projecting parts of a trap, such as the springs and levers. The platform may also contain holes for spiking the device to the ground. A captured animal is less likely to escape from a loose trap, usually connected via a swivel and chain to a pin driven in the earth, than one that is held firmly to the ground. Since the bedding device releases the trap upon triggering, its use does not increase the number of escapes by trapped game. In freezing weather, the device prevents the trap from freezing to the ground, since there is little or no direct contact between the earth and a trap fitted into the device, further preventing losses.

The invention can be more clearly understood from the detailed description of a preferred embodiment that follows when taken in conjunction with the drawings.

DETAILED DESCRIPTION OF PREFERRED EMBODIMENT

Figure 1:
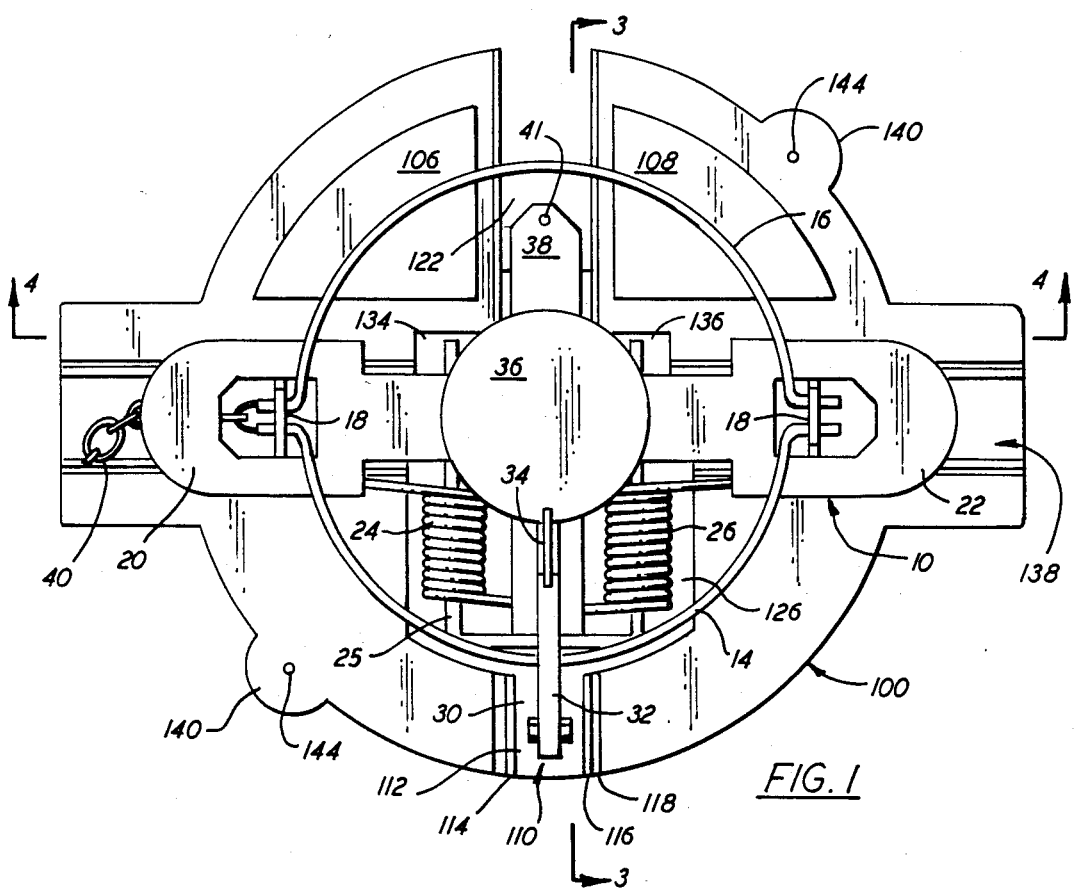
FIG. 1 is a top view of a typical animal leg hold trap seated in an embodiment of a bedding device according to invention.

The accompanying figures, described in the following paragraphs, are not drawn to scale, but depict the principles of of the invention. In FIG. 1, a typical leg hold trap 10, such as the kind available under the Blake & Lamb and Victor trademarks, is shown in top view in its set position. The trap is shown seated in an embodiment of the invention configured for the type of trap illustrated. The bedding device embodiment is seen more clearly in the other figures. It is understood that embodiments of the invention can be readily prepared, from the description that follows, to fit traps of other designs.

Trap 10 includes a pair of jaws 14 and 16 that are rotatably mounted along separate axes to a transverse frame member 18. Jaw 14 is the setting jaw; that is, jaw 14 is held firmly in place by the setting means when the trap is in the set position, as shown. Jaw 14 cannot move until released by the triggering means. Jaw 16 is the free jaw and can freely rotate about its axis, away from frame member 18, when trap 10 is in the set position. Spring levers 20 and 22 are also rotatably mounted on frame member 18 and are urged upward by coil springs 24 and 26, respectively. When the trap is released from its set position, springs 24 and 26 urge levers 20 and 22 toward each other, in turn driving jaws 14 and 16, which pass through the levers, together to their grasping position. In the grasping position, the springs hold the jaws together to grasp the leg of an animal that has triggered the trap. Springs 24 and 26 are mounted on separate legs of a U-shaped bracket 25 that is joined to a longitudinal frame member 30. One end of each of springs 24 and 26 bears on frame member 30 and the other end bears on one of levers 20 and 22. Frame members 18 and 30 are joined together, for example by welding, at the center of trap 10.

Trap 10 is releasably held in its set position by a dog 32, one end of which releasably engages a lever 34 that is attached to a pan 36. The opposite end of dog 32 pivots at one end of frame member 30. Dog 32 crosses over setting jaw 14 and holds it down in the set position, when the dog engages a notch in lever 34 of pan 36. The edge of dog 32 that engages the notch can be modified so that only a very slight pressure on pan 36 will allow the dog to become disengaged from the notch and trigger the trap. That is, the dog can be filed to chisel edge to produce a hair trigger or a blunt edge requiring relatively firm pressure for release. In any event, the dog and notch releasably hold the trap in its set position until pressure is applied to the pan, tilting it and disengaging dog 32 from lever 34. That disengagement triggers the trap by releasing the setting jaw.

As shown in FIG. 1, longitudinal frame member 30 has a tongue 38 on the opposite side of pan 36 from springs 24 and 26. As more clearly seen in the other figures, tongue 38 is not planar, but usually includes a complex contour having several bends. The opposite end of member 30 curves upward, toward pan 36, and contains a hole forming the pivotal connection of dog 32 to trap 10. A chain 40 is connected by a swivel (not shown) to one end of transverse member 18. The swivel for attaching a chain may also be connected to the other end of frame member 18 or can be connected at hole 41 to tongue 38. A swiveling connection permits trap movement reducing escapes by trapped animals attempting to free themselves.

Figure 4:
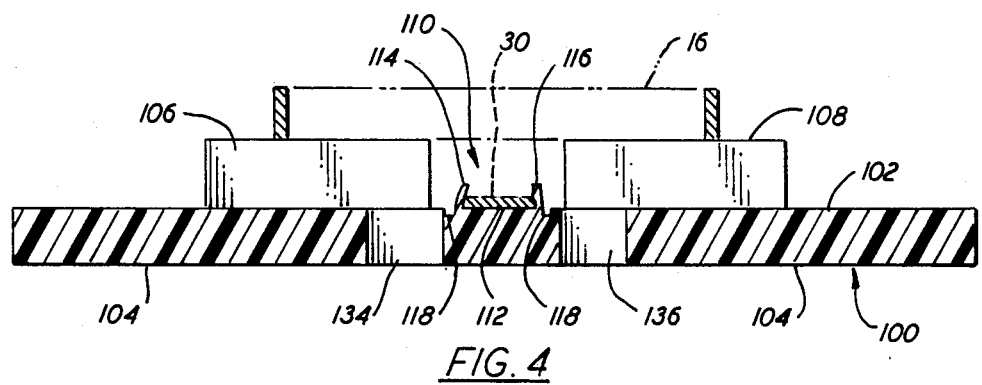
FIG. 4 is a sectional view of the embodiment of the invention shown in FIG. 1 taken along section line 4—4 with a trap partially indicated in broken lines.
Figure 5:
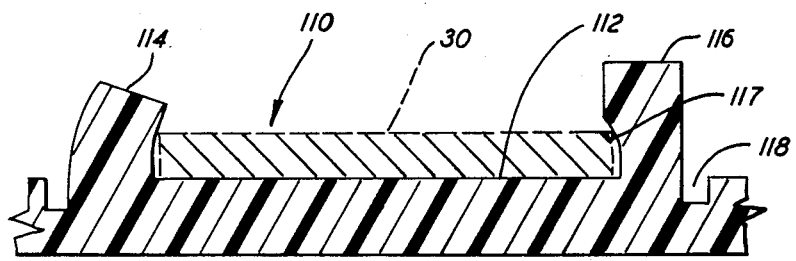
FIG. 5 is an enlarged sectional view of a portion of the embodiment of the invention shown in FIG. 4.
Figure 2:
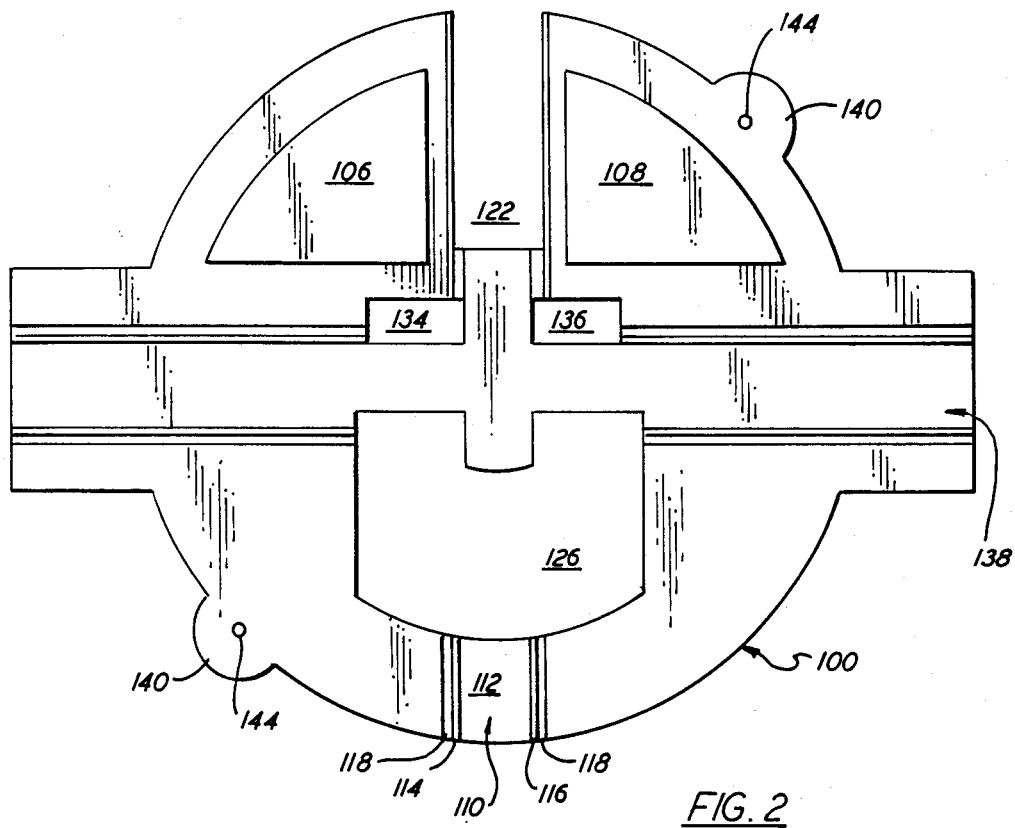
FIG. 2 is a top view of the embodiment of the invention shown in FIG. 1.
Figure 3:
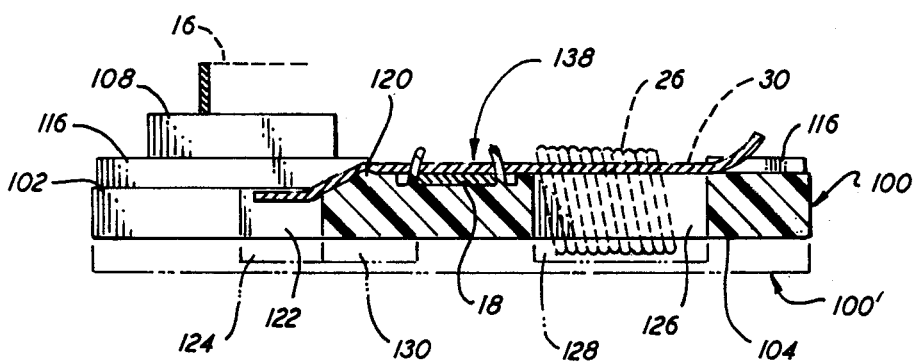
FIG. 3 is a sectional view of the embodiment of the invention shown in FIG. 1 taken along section line 3—3 with a trap partially indicated in broken lines.

The embodiment of a bedding device according to the invention shown in FIG. 1 is more clearly seen in FIGS. 2, 3 and 4. Since in all figures like elements are given the same reference numbers, it is not necessary to describe the common elements for each of the figures. Some elements of trap 10 are shown by broken lines in partial cross section in FIGS. 3, 4 and 5 to aid understanding of the invention. These sectioned trap elements are identified by thin diagonal lines. In FIGS. 3, 4 and 5, sectioned surfaces of the embodiment of FIG. 1 are identified by alternating thick and thin diagonal lines.

FIG. 2 shows a top view of the novel bedding device, including a unitary platform 100 formed, for example, by molding or machining, from a single piece of material. It is preferred that the platform be made of a material that does not absorb or retain odors so that the scent of the trapper is not emitted by the bedding device. Polypropylene, polystyrene, teflon and other polymers are suitable materials that can be readily machined or molded and that do not absorb odors. Platform 100 has a top side 102, shown, and a generally planar opposed bottom side 104, both of which are seen in side view in FIGS. 3 and 4. Platform 100 includes two protrusions 106 and 108 that are preferably symmetrical and extend out of top surface 102. Protrusions 106 and 108 support free jaw 16 when trap 10 is in its set position. Although one of the protrusions may be sufficient to support jaw 16, it is preferred that two protrusions be employed to prevent the free jaw from wiggling when a curious animal steps on it. The height of the protrusions is chosen to support the free jaw without raising it above the height of setting jaw 14 in its set position. A typical protrusion height is 0.625 inches. Protrusions 106 and 108 preferably occupy as much volume as possible without interfering with the trap elements and their operation. The greater the volume filled by the protrusions, the less sifted soil must be packed in the hole excavated for the trap.

Protrusions 106 and 108 are separated to permit tongue 38 to pass between them. A channel 110 to receive longitudinal frame member 30 is formed in the passage between the protrusions. Channel 110 is defined by a floor 112 on surface 102 and two opposed walls 114 and 116 that stand up from top side 102. A groove 118 may be formed alongside each wall outside channel 110 to aid in achieving the preferred resiliency in walls 114 and 116. As shown in FIGS. 3, 4, and 5, upstanding walls 114 and 116 are preferably convergent so that they are more closely spaced at their tops than where they arise from surface 102. It is preferred that bedding device 100 be formed from a resilient material, for example from a polymer, as previously mentioned. In that case, the free edges of walls 114 and 116 can be deflected apart from each other as frame member 30 is inserted into channel 110. When the frame member is seated, the walls are still somewhat deflected. The deflected walls hold the frame member securely, yet upon triggering of trap 10, release frame member 30, springing it out of channel 110.

I have found that although the lengths of trap frame members vary according to the model of the trap and even vary between production runs of the same model of trap, the frame member widths are frequently 0.75 inches. Therefore, a bedding device with one or more channels having walls spaced to accept 0.75 inch wide frame members is usable with traps of different sizes. The channel design shown in FIG. 5 with unsymmetrical walls works well in holding a frame member while a trap is being set and releasing the member when the trap is triggered. The preferred channel has a curved wall 114 that is about 0.125 inches high separated at its base by about 0.75 inches from a relatively straight wall 116 that is about 0.1875 inches high. Relatively straight wall 116 includes a concave portion 117 beginning at the floor of the channel and ending below the tip of the relatively straight wall.

As mentioned above, tongue 38 of trap frame member 30 is curved rather than planar. Floor 112 of channel 110 includes a hump 120 and an opening 122 cut through platform 100 to accommodate the contour of tongue 38. Opening 122 extends from just beyond hump 120 to the periphery of platform 100. A thicker embodiment of the invention, 100', indicated in FIG. 3 by alternating long and short broken lines, includes a depression 124 in place of opening 122. Depression 124 does not go all the way through platform 100', but otherwise is similar to opening 122. Platform 100 includes other openings, i.e. cutouts or depressions, that accommodate various members of trap 10. For example, a generally horseshoe-shaped cutout 126 receives springs 24 and 26. In addition, symmetrically disposed holes 134 and 136 accommodate levers 20 and 22. (Spring cutout 126 also partially accommodates levers 20 and 22.) In the thicker embodiment 100', depression 128 replaces cutout 126 and receives the springs. Hole 136 can be replaced by depression 130 if thicker platform 100' is employed.

Platform 100 also includes a second channel 138 generally perpendicular to channel 110 for receiving and releasably retaining transverse frame member 18. Channel 138 is substantially similar to channel 110, having a floor and opposed, upstanding convergent walls. Since frame member 18 is disposed beneath frame member 30, the floor of channel 138 lies deeper in platform 100 than does floor 112 of channel 110. The walls may have a groove on surface 102 outside the channel to assist achievement of the desired wall resiliency. When two channels are present, both release the frame members retained in them when the trap is triggered.

Ears 140 and 142 extend from the sides of platform 100. Each ear includes a hole 144 through which a spike can be driven to hold the bedding device firmly to the ground, even when a trap seated in it is triggered.

Figure 6:
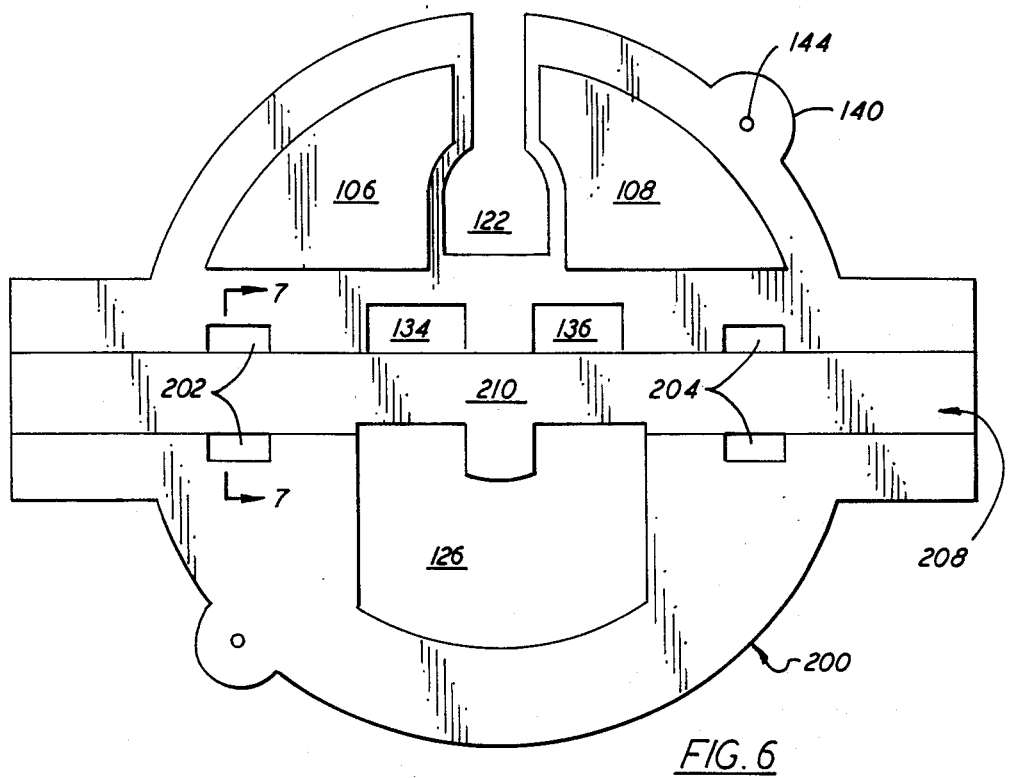
FIG. 6 is a top view of an embodiment of a bedding device platform according to the invention.

In FIG. 6 another embodiment of the invention is shown in top view. Like elements of the embodiment of FIG. 6 and of the preceding figures are given the same reference numbers and detailed repetition of their description is not necessary. The embodiment of FIG. 6 includes a platform 200 having opposed top and bottom sides 102 and 104, free jaw supporting protrusions 106 and 108, holes 134 and 136 for accommodating trap levers and hole 126 for accommodating trap springs. Platform 200 also includes two pairs of generally symmetrically disposed holes 202 and 204, instead of the channel walls described for platform 100. These holes are used in conjunction with clips 206, shown in cross section in FIG. 7 and in perspective in FIG. 8, to retain a frame member of a trap in a seated position of the platform until the trap is triggered. The holes in each pair, 202 and 204, are disposed on opposite sides of a groove 208, having a floor 210 cut into the top side of platform 200. Groove 208 is similar to channel 138 of platform 100 and is dimensioned to receive the trap frame member, such as member 18 of FIG. 1, that lies lowest when the set in the field. When a trap seated on the platform is triggered, the trap is released from platform 200 by clips 206 through the energy released in the triggering.

Figure 7:
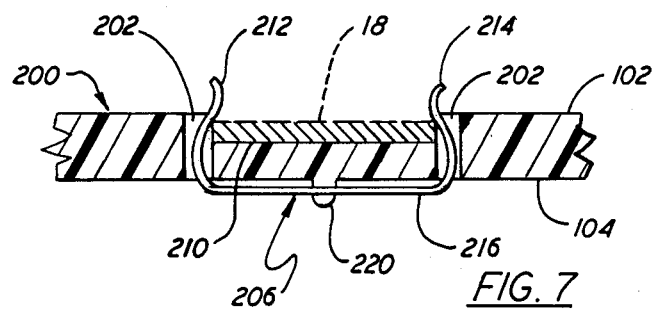
FIG. 7 is an enlarged sectional view of a portion of the platform shown in FIG. 6 taken along section line 7—7.
Figure 8:
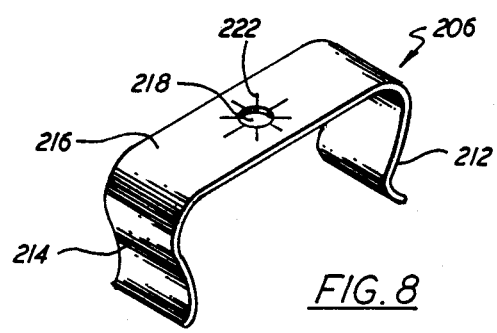
FIG. 8 is a perspective view of a clip for use with the platform of FIG. 6.

In the enlarged sectional view of FIG. 7, clip 206 is shown engaged to platform 200. U-shaped clip 206 includes opposed legs 212 and 214 that have a complex curved shape. The legs converge toward their free ends to a narrowed opening and then diverge to their free ends. The narrowed opening is dimensioned to retain a trap frame member, such as frame member 18. Clip 206 is preferably formed so that legs 212 and 214 can be deflected during the insertion of a trap frame member and then return to near their original position to retain the trap. The trap is released in reverse fashion. Clip 206 may be formed of spring steel, preferably a corrosion-resistant alloy such as 304 stainless. Alternatively, the clips could be formed from a plastic.

Clip 206 includes a head 216 bridging legs 212 and 214. For ease of use, the clip includes a means for engaging platform 200. Preferably, head 216 includes a hole 218 (best seen in FIG. 8) which has a perimeter that engages a projection 220 that extends from the bottom side of platform 200. The size of hole 218 and projection 220 are chosen for a snug fit so that clip 206 may be installed or removed from platform 200. However, some force is required for either operation so that a clip is retained on the platform for storage and during insertion of a trap frame member between legs 212 and 214. Particularly if clip 206 is metal, head 216 may include slits 222 radiating from hole 218 like a so-called Tinnerman nut to retain a clip tightly on projection 220. Other style clips may be made with other means of engagement to platform 200 without departing from the spirit of the invention. For example, clip legs might be molded as an integral part of platform 200. While platform 200 is slightly more complex in use than is platform 100, platform 200 is simpler and cheaper to mold or machine.

By using the bedding device, the trapper can improve his speed and accuracy in setting a trap. A trap can be set and loaded into the bedding device before reaching the trapping site, saving time at the site. The device does not absorb or emit human odor simplifying handling of a trap without warning an animal of the presence of a trap. The device, and particularly protrusions 106 and 108, occupy volume that does not need to be packed with sifted soil. A trap can be set more rapidly without the use of much, if any, foreign soil. The protrusions support a free jaw of a trap firmly to avoid premature disclosure of the placement of the trap. The platform provides a solid base for the entire trap, decreasing the probability that the trap will wiggle if an animal steps on its peripheral parts before stepping on the pan. Little of the energy released upon triggering of the trap is expended in compacting the soil beneath the trap since the platform isolates the trap from the soil. That is, when the platform is used, more of the released energy is focussed on closing the jaws than might otherwise be the case, since very little spring energy is expended in firming any loose soil that may be present beneath the trap. The bedding device also isolates the trap and its covering soil from the underlying earth, both thermally and with respect to moisture. As a result, the platform virtually eliminates freezing of the trap to the ground.

The invention has been described with respect to certain preferred embodiments. Various modifications within the spirit of the invention will occur to others. Accordingly, the scope of the invention is limited solely by the following claims.

I claim:

1. A bedding device for use with an animal leg hold trap, said device including a platform having opposed top and bottom sides, retaining means including a pair of opposed, convergent upstanding wall members extending from the top side of said platform for flexibly receiving and retaining a first frame member of an animal leg hold trap against said top side and for flexibly releasing said first frame member upon triggering of the trap and a first channel disposed on the top side of said platform having a floor shaped to accommodate said first frame member of said trap, wherein said wall members are disposed on opposite sides of said first channel.

2. The bedding device of claim 1 wherein said retaining means comprises at least one clip having opposed convergent legs as said wall members, and a head joining said legs and means for engaging said clip to said platform.

3. The bedding device of claim 2 wherein said means for engaging said clip to said platform comprises two holes in said platform for passing said legs from said bottom side to said top side.

4. The bedding device of claim 2 wherein said means for engaging includes a hole in said head and a projection extending from the bottom side of said platform for engagement with the perimeter of the hole in said head.

5. The bedding device of claim 1 wherein the top side of said platform includes at least one protrusion extending from said top side for supporting a jaw of said trap.

6. The bedding device of claim 1 wherein said platform includes at least one hole for receiving a spike for attaching the platform to the ground.

7. The bedding device of claim 1 wherein said upstanding wall members and platform are unitary.

8. The bedding device of claim 1 wherein said platform is made of a polymer that does not absorb odors.

9. The bedding device of claim 1 wherein said platform is made of one of the group consisting of: polypropylene, polystyrene and teflon.

10. The bedding device of claim 1 wherein a second channel having a floor shaped to accommodate a second frame member of said trap is disposed on the top side of said platform.

* * * * *